United States Patent
Schmitt et al.

(10) Patent No.: US 6,815,631 B2
(45) Date of Patent: Nov. 9, 2004

(54) METHOD AND DEVICE FOR MULTIPLE STAGE ARC-WELDING

(75) Inventors: Klaus Gisbert Schmitt, Giessen (DE); Michael Krengel, Giessen (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/169,899

(22) PCT Filed: Jan. 9, 2001

(86) PCT No.: PCT/EP01/00145
§ 371 (c)(1),
(2), (4) Date: Jul. 10, 2002

(87) PCT Pub. No.: WO01/51241
PCT Pub. Date: Jul. 19, 2001

(65) Prior Publication Data

US 2003/0019847 A1 Jan. 30, 2003

(30) Foreign Application Priority Data

Jan. 14, 2000 (DE) ........................................ 100 01 344

(51) Int. Cl.$^7$ ............................................... B23K 9/20
(52) U.S. Cl. .......................................... 219/99; 219/98
(58) Field of Search ......................... 219/98, 99, 130.1, 219/130.21

(56) References Cited

U.S. PATENT DOCUMENTS

| | | | |
|---|---|---|---|
| 4,564,742 A | * | 1/1986 | Karlsson ................... 219/130.1 |
| 5,171,959 A | | 12/1992 | Schmitt et al. |
| 5,252,802 A | | 10/1993 | Raycher |
| 5,317,123 A | | 5/1994 | Ito |
| 5,321,226 A | | 6/1994 | Raycher |
| 5,389,761 A | | 2/1995 | Kresse, Jr. |
| 5,502,291 A | * | 3/1996 | Cummings .................... 219/98 |
| 5,662,820 A | * | 9/1997 | Schwiete et al. ............. 219/99 |
| 5,938,945 A | * | 8/1999 | Hofmann et al. .............. 219/99 |
| 5,977,506 A | | 11/1999 | von Daniken |
| 6,091,049 A | * | 7/2000 | Ikeda et al. ............. 219/130.32 |
| 6,215,085 B1 | * | 4/2001 | Cummings et al. ........... 219/99 |

FOREIGN PATENT DOCUMENTS

| | | |
|---|---|---|
| DE | 4313502 | 10/1994 |
| DE | 4437264 | 4/1996 |
| GB | 2042956 | 2/1980 |
| WO | WO 00/78495 | 12/2000 |

OTHER PUBLICATIONS

International Search Report for PCT/EP01/00145, dated Apr. 20, 2001, 6 pages.

* cited by examiner

Primary Examiner—Clifford C. Shaw
(74) Attorney, Agent, or Firm—Edward D. Murphy

(57) ABSTRACT

The invention relates to a multiple stage method for arc-welding a bolt (3) to a metal structure (1), said bolt (3) having a flange (5) at the end that is to be welded on. The actual welding process is preceded by a cleaning method that is carried out by means of an arc. Said cleaning method consists of two or more stages. It is crucial to control the arc and the distance between the bolt (3) and the structure surface (7) in such a way that only cleaning takes place, without causing premature welding. While during the first cleaning state, only a small surface is cleaned intensively, in the second stage, a larger surface is cleaned due to a greater distance between the bolt (3) and the structure surface (7). Separation through interruption of the arc and maintenance of the bolt (3) in a stationary position at a distance from the structure surface (7) must take place between the first and second cleaning stages. The second cleaning stage can lead into the actual welding process continuously however, without interrupting the arc, the bolt (3) then being permanently connected to the structure (1). The invention method is particularly suitable for welding bolts to aluminum structures, even where a surface coating is present, e.g. an oxide and/or a zinc layer and/or an oil film and/or a wax layer.

32 Claims, 2 Drawing Sheets

METHOD AND DEVICE FOR MULTIPLE STAGE ARC-WELDING

BACKGROUND OF THE INVENTION

The invention relates to a method and device for multiple-stage arc welding, whereby a bolt having a flange at the end that is to be welded on is moved up to a metal structure and welded on.

Welding a metal bolt to a metal structure by means of arc welding is a widely used method, which finds application especially in the automobile industry. There are essentially different welding methods with corresponding designs of the associated bolts.

In one welding method, the so-called lifting ignition or electric-arc bolt welding method, the end of the bolt to be welded on has a flange that on its underside usually also has a bead of material that may be domed or has the shape of a blunt cone. In the lifting ignition method, the bead of the bolt is first moved up to a structure until an electrical contact is made. A high electric short circuit current from a welding power source is sent through the bolt and the structure. The bolt is then again slightly lifted from the structure, whereby an electric arc is produced between the bolt and the structure that fuses the structure in a fusion region as well as parts of the bead. After a specified period the bolt is lowered into the fused mass produced in the fusion region, whereby on subsequent cooling a very sturdy weld joint is produced between the bolt and the structure.

Another method for arc welding bolts to a metal structure is the so-called tip ignition method. There the end of the bolt to be welded on has a salient or projecting tip, which is first moved up to the structure. The tip is dimensioned in such a way that when a welding current is applied it is suddenly vaporized with formation of a hot plasma, whereby the remaining end to be welded on and the structure are fused. At the same time, the bolt is rapidly lowered into the fused mass. The great energy required for this operation results in a very loud explosive noise. In addition, the structure generally must be supported on the back of the fusion region, since otherwise the impact of the bolt at high speed may cause vibrations that have an adverse effect on weld quality. Besides, the quality of the weld is greatly dependent on the quality of the tip.

The increasingly broader application of bolt welding methods also results in applications that cannot be accomplished particularly well by either of these two methods. Thus, there are cases in which the structure in the fusion region is coated or fouled, especially with a wax layer or oil film, and cases in which the structure is a material, particularly aluminum, having an oxide layer. Coatings deleterious to the welding operation, such as for example hot galvanizing, are also encountered. Combinations of these cases likewise occur.

It is well known that two stages may be provided in bolt welding, the first stage acting to establish the surface condition and/or being a cleaning stage and the second stage producing the weld joint. However, a reproducibly great cleaned surface cannot always be produced in a single cleaning stage, since in variable surface conditions, the first ignition of an electric arc plainly leads to results that are hard to reproduce.

SUMMARY OF THE PRESENT INVENTION

For such cases, the object of the present invention is to make available a generic method and a device for arc welding a bolt to a metal structure, which permits high-quality and reproducible weld joints on surfaces that are provided with an oxide layer and/or some other surface coating, in particular oil, wax or even a zinc layer, where the method should also work under acceptable operating conditions and be economical.

One method of the present invention uses the lifting ignition method wherein the bolt to be welded has a flange is moved up to the metal structure and, prior to being welded thereto, the surface of the structure will be cleaned in a two-step process by an electric arc cleaning the surface of the structure with the bolt off the surface. The strength and duration of the current used for cleaning may be varied as well as the distance between the bolt and the surface. Current strength may be in the range of between 100 MA to 100 A; the duration in the range of 40 MS to 150 MS; and the distance may be in the range of 1.0 to 3.0 mm. The structure of the device that practices the method may include a welding source having two capacitor batteries, a bolt holder, a linear drive, such as an electromagnetic linear motor, for moving the bolt holder and a rapid control to control the course of motion and the accuracy of the current within the range of 2 to 20 ms.

More specifically, the method consists of using an arc generated between the bolt and the structure, in the fusion region therebetween to clean the surface of the structure in the fusion region in at least two cleaning steps, and only then is the metallic connection between the bolt and the structure made by the customary electric-arc bolt welding.

When the distance of the bolt from the structure and the operating time of the electric arc are correctly coordinated, the arc may in particular be used for cleaning the structure surface of an oil film or wax layer, as well as of oxides or hot galvanizing. In this way, thorough cleaning of the structure surface can be obtained in at least the fusion region of the bolt, so that the subsequent metallic connection can be reliably obtained by electric-arc bolt welding without special effort. There the first cleaning step by ignition of a high-power but narrowly limited electric arc produces a precise contact area, which upon renewed lowering of the bolt and its lifting permits a highly reproducible second cleaning arc that then cleans the entire later fusion region.

According to an advantageous development, cleaning of the structure surface therefore is carried out in two separate successive cleaning stages where control of the entire multiple-stage arc-welding method is effected by moving the bolt in the direction of the structure and away from it, as well as by the time and duration of the electrical connection of the bolt with the welding current source. Different aspects of the cleaning operation may be focused on in this two-stage cleaning by means of the electric arc.

In particular, if the method in the first cleaning stage is produced after the bolt which had been in contact with the surface is subsequently moved away, an especially intensive cleaning of a relatively small surface is obtained, which corresponds approximately to part of the cross-sectional flange area of the bolt. In this method stage, especially oil films and oxides are satisfactorily removed.

After completion of the first cleaning stage the bolt remains raised from the structure, and the electric arc remains disconnected. Accordingly, the two cleaning stages are completely separated from one another, and excessive heating of the bolt and structure is also avoided, so that upon renewed lowering of the bolt, it does not encounter a molten surface. Due to the relatively great distance of the bolt from the structure surface, operation of the method in the second cleaning stage is produced by again moving the bolt up to contact the surface of the structure and, after being connected to the welding current source, is moved away a predetermined distance which results in an electric arc that causes a greater area of the surface to be cleaned; this area corresponds to approximately the size of the cross-sectional flange area of the bolt. This cleaning stage is especially suitable for also removing wax layers from the structure surface, where these wax layers may be present in a thickness of 1 to 10 $g/m^2$. In this way, all prerequisites for subsequent metallic connection by electric-arc bolt welding are present. In the second cleaning stage, the distance of the bolt from the structure is predetermined, or selected, such that a sufficiently great region of the structure can be cleaned. The most favorable distance therefore depends approximately on the size of the later fusion region, i.e., on the diameter of the flange to be welded on.

Since fusion of the structure surface must take place at this point anyway, the second cleaning stage leads smoothly into the operation of electric-arc bolt welding; i.e., the arc remains uninterrupted in these two method stages.

Only by correct operation of the electric arc, necessary in every case, is it thus possible first to carry out thorough cleaning of the crucial regions of the structure surface and then to obtain an especially high-grade metallic connection by the method according to the invention.

When the materials are the same, i.e. both the bolt and the structure are either aluminum or steel or the like, then the method according to the present invention is especially well implemented and acts to produce a solid weld therebetween.

Performance of one or more additional cleaning stages is possible and may be of advantage for certain applications.

According to an especially advantageous refinement of the invention, before cleaning a characteristic magnitude that is proportional to the degree of fouling of the surfaces to be welded together, by means of which the number of cleaning stages is determined, is first measured. This is used to determine the degree of required cleaning and insufficient or excessive cleaning of surfaces is avoided. The electrical surface resistance, which in first approximation is proportional to the fouling of the surfaces, is the obvious characteristic magnitude. The surface resistance and hence the required number of cleaning stages is determined by means of a current and/or voltage measurement between the surfaces to be welded together. In a special refinement, the contact voltage between the bolt and the structure is measured.

In an advantageous development of the method according to the invention, cleaning is omitted if the characteristic magnitude falls below a first threshold value, takes place once if the characteristic magnitude lies between the first threshold value and a second threshold value, and takes place at least twice if the characteristic magnitude lies above the second threshold value. Criteria for the number of cleaning stages, which may differ depending on the type of weld to be obtained, the nature of the surface, the materials to be welded that are used and other welding-specific parameters, are specified by means of at least one, preferably two or more, threshold values for the characteristic magnitude.

A device for performance of the method must be suitable for making available even brief and exact fairly strong current surges; the necessary welding current for the electric arc must be available shortly thereafter. This requires a welding current source with suitable control means, which may for example contain one or two capacitor batteries. In addition, the device must have all typical means for performing the lift ignition method, namely a bolt holder, a linear drive for moving the bolt holder and a rapid control capable of controlling the course of motion of the bolt and the response of the welding current with great accuracy, in particular with time accuracies in the range of 2 to 20 ms.

A linear drive, in particular with an electromagnetic drive, has proved to be especially suitable for the present task.

Such drives, as described for example in U.S. Pat. No. 6,215,085, permit precise control or regulation of the position and speed of the bolt during the welding operation.

Accordingly, it is an object of the present invention to provide a method and device for multiple-stage welding which overcomes the disadvantages of the prior art and provides reliable and sturdy weld connections between the bolt and the structure. It is another object of the present invention to use the lift ignition method.

It is still another object of the present invention to provide a method and device for multiple-stage welding that cleans the surfaces to be welded prior to producing the weld, which is relatively inexpensive, which is simple to practice and reliable to produce.

BRIEF DESCRIPTION OF THE ACCOMPANYING DRAWINGS

Additional advantages and features of the present invention will become apparent from the subsequent description, taken in conjunction with the accompanying drawings, wherein.

DETAILED DESCRIPTION OF THE PREFERRED EMBODIMENTS

Figure 1:
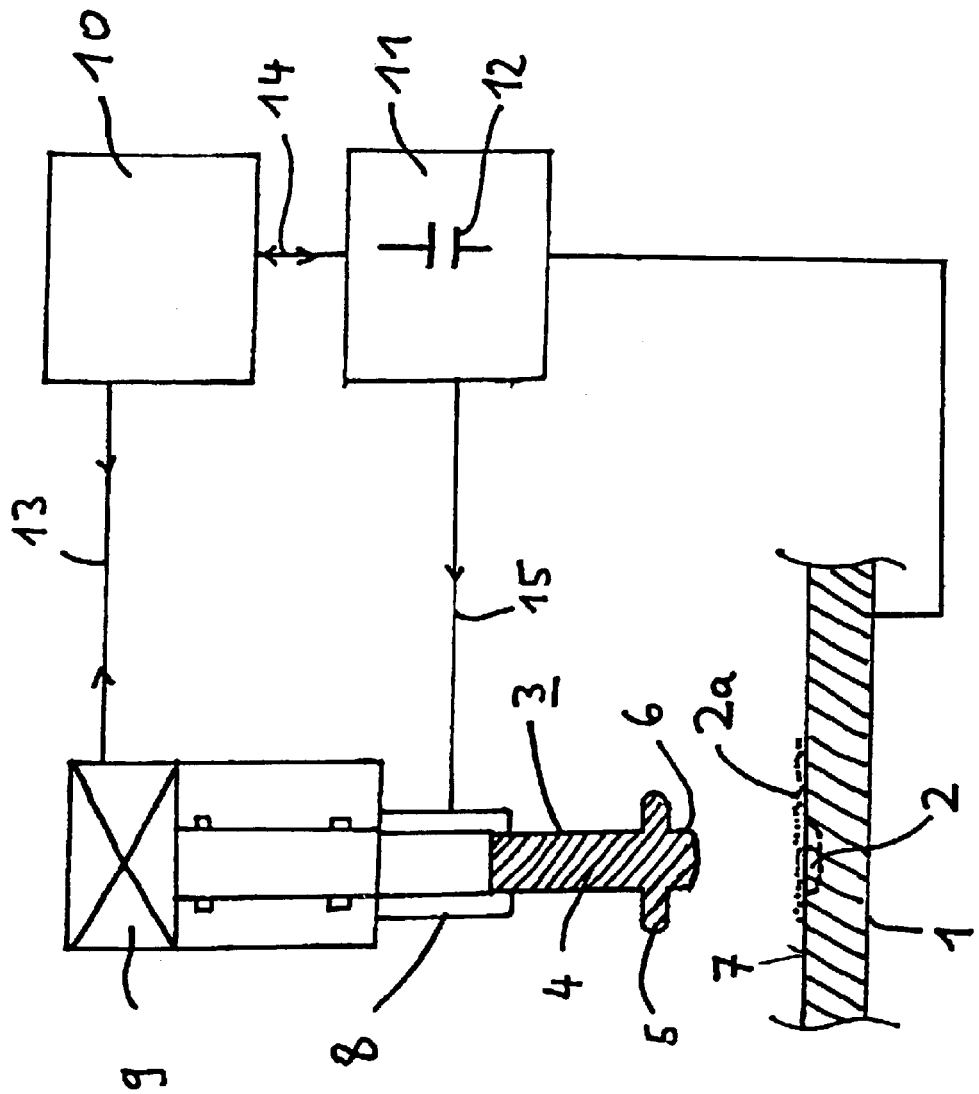
FIG. 1 shows a schematic cross section of an arrangement for bolt welding.

FIG. 1 shows, in cross section, the arrangement of a bolt above the structure to which it is to be welded, as well as the most important parts of the associated welding device.

The reference character 1 designates a structure which is, for example, a part of a vehicle body. This structure may be of aluminum or an aluminum alloy and have a fusion region 2, which may be covered by a surface coating 2a. The surface coating may be any one of a number of coatings, such as an oxide, or a zinc layer, or an oil film, or a wax layer, or the like. A bolt 3 to be welded, having a bolt shaft 4 and a flange 5, which at its lower end has a bead 6 of material, is arranged above the structure 1 on a bolt holder 8. The bolt holder 8 can be moved axially, precisely regulated or controlled, by means of a linear drive 9. Used for this purpose is a control unit 10, which is connected with the linear drive 9 via a control line 13. In addition, the control unit 10 is also connected with a welding current source 11 via a control line 14, the welding current source 11 supplying the bolt holder 8 with the required welding current via a current line 15. The welding current source 11 contains for example a capacitor battery 12.

For performance of the preferred method according to the invention, the bolt 3 in the bolt holder 8 is lowered far enough to contact the structure surface 7 electrically in the fusion region 2. A first discharge ignites an electric arc, which produces cleaning of the structure surface on a small area that corresponds approximately to part of the cross sectional flange area of the bolt. However, the connection to the welding current source 11 is interrupted after 40 ms, and the bolt 3 remains in its position at a distance from the structure surface 7 until after complete extinction of the electric arc. Its outage phase may last approximately 30 ms or longer. In this way, overheating of the bolt and structure surface is avoided, and welding on of the bolt the next time it is lowered is prevented. The distance of the bolt 3 from the structure surface 7 during this first cleaning stage is approximately 1.0 to 3.0 mm.

The second cleaning stage is then initiated by the bolt again being moved out of its spaced-apart rest position up to the structure surface 7, until it contacts the latter in the fusion region 2. Now an electric arc is again ignited, but the bolt is moved away a greater distance from the structure surface than before and is held there. In this way, cleaning of the structure surface is effected on a greater surface area than in the first cleaning stage. This time the cleaned area may exceed the cross sectional flange area of the bolt 3.

The impurities in the fusion region, labeled 2a, may be removed by this two-stage cleaning. Here, the first cleaning stage, acting intensively on a relatively small surface area, serves primarily to remove oxide and oil films, while with the second cleaning stage wax layers in a thickness of 1 to 10 $g/m^2$ are also eliminated. In both cleaning stages, the current strength may be approximately 100 mA.

After completion of the second cleaning stage the electric arc is not interrupted. Rather, the bolt is again moved nearer to the structure surface 7, until it has a distance suitable for initiating the welding operation. Thus, the second cleaning stage leads smoothly into the operation of metallic connection by arc welding. Lastly, the bolt 3 is brought into contact with the now metallically clean fusion region 2. At the end of the welding operation a sturdy weld joint exists between structure 1 and welding bolt 3. The exact time sequence of the two cleaning operations, the cooling times and the welding method require precise control of the motions of the bolt holder 8 and the welding current source 11. A drive with a linear motor, as also used in the conventional lift ignition methods, is especially suitable for such precise control.

Figure 2:
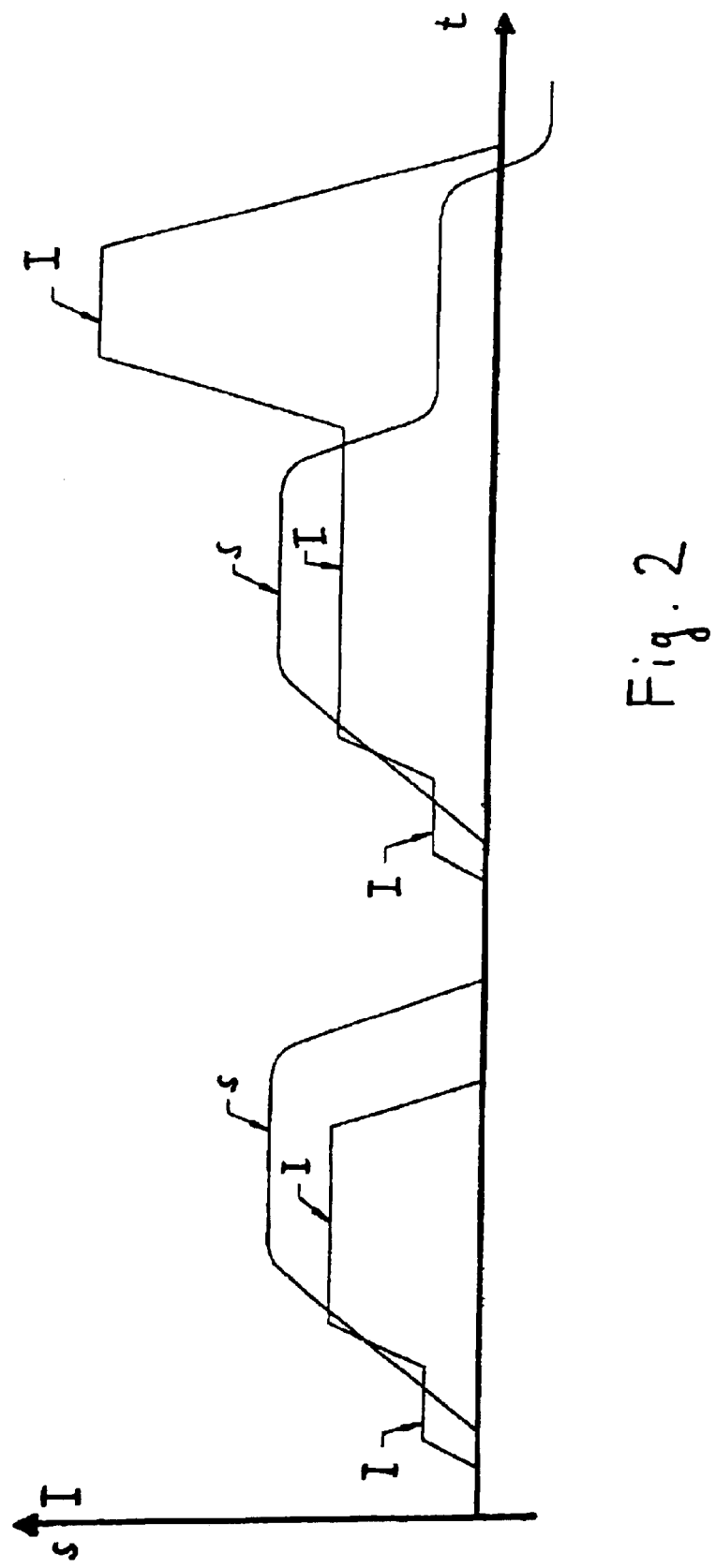
FIG. 2 shows a diagram of the time-dependent course of the bolt distances from a structure as well as the corresponding course of the current strength I.

The operations described are also reflected in FIG. 2, in which the time courses of current strength I and the distances s of the bolt 3 from the structure 1 are represented. It can be seen that the current I is turned on while the bolt 3 is still resting on the structure 1. An electric arc is ignited upon lifting of the bolt 3, whereby the current I increases for the first cleaning stage. After the current I is turned off, the bolt to be welded remains raised until the surface of the structure 1 is cooled off. Renewed lowering of the bolt 3, connection of the current I, lifting of the bolt 3 for the second cleaning stage, lowering of the bolt 3 for increase of the welding current and, lastly, lowering of the bolt 3 into the fused mass with simultaneous disconnection of the current take place.

The present invention is suitable especially for automated welding methods in which a plurality of welding bolts are to be placed on structures, particularly of aluminum or aluminum alloys, with weld joints of high quality and reproducibility.

In general, the above-identified embodiment is not to be construed as limiting the breadth of the present invention. It is understood that other modifications or other alternative constructions will be apparent which are within the scope of the invention as defined in the appended claims.

What is claimed is:

1. A method for multiple-stage electric-arc welding of bolts, whereby a bolt having a flange at the end that is to be welded on, is moved up to a metal structure and welded on, comprising the steps of:
    a) generating an arc between the bolt and the structure, the surface of the structure in the fusion region to first clean in at least two cleaning stages;
    b) welding by electric-arc bolt welding the bolt and the structure;
    c) cleaning of the structure surface in two separate successive cleaning stages;
    d) controlling the current during the entire multiple-stage electric-arc welding method in coordination with the movement of the bolt in the direction of the structure and away from it;
    e) welding the bolt to the structure via the welding current source;
    f) a first cleaning stage; and
    g) a second cleaning stage, wherein:
        i) the bolt is moved up to the structure until it contacts the structure in a fusion region,
        ii) the bolt, upon contacting the structure at the latest, is electrically connected with the welding current source and is moved away to a distance from the structure surface such that the resulting electric arc produces cleaning of the structure surface on a small area that corresponds to part of the cross-sectional flange area, and
        iii) the connection to the welding current source is interrupted, and the bolt remains in its position at a distance from the structure surface until after extinction of the electric arc.

2. The method according to claim 1, further comprising: performing the first cleaning stage at a current strength of about 100 A and a duration of approximately 40 ms.

3. The method according to claim 1, further comprising: setting the distance between the bolt and the structure surface in the fusion region during the first cleaning stage at approximately 1.0 to 3.0 mm, whereby the distance is of approximately the same order of magnitude as the diameter of the fusion region.

4. The method of claim 1, further comprising: keeping the bolt at rest for at least 30 ms after disconnection of the welding current source, whereby it remains at the same distance from the structure surface at the end of the first cleaning stage.

5. The method of claim 1, further comprising: performing the second cleaning stage at a current strength of 100 mA and a duration of 150 ms.

6. The method of claim 1, further comprising: using aluminum or an aluminum alloy for the metal structure.

7. The method of claim 6, further comprising: using the same material for the bolt as that of the structure.

8. The method of claim 1, further comprising: using steel for the bolt and the structure with the structure having a surface coating.

9. The method of claim 1, further comprising: providing more than a first and a second cleaning stage before the actual welding operation.

10. The method of claim 1, further comprising: measuring the electrical resistance at the structure before cleaning thereof, which is proportional to the degree of fouling of the surfaces to be welded together to determine the number of cleaning stages that are required.

11. The method of claim 1, further comprising: measuring a contact voltage between the bolt and the structure.

12. The method of claim 1, wherein the bolt and the structure are parts of an automobile.

13. The method of claim 1, wherein the metal structure is a body panel for a motor vehicle.

14. A system for cleaning and welding a threaded member and a structure using a welding head, the system comprising:
    a) a welding head operably moving the threaded member in relation to the structure;
    b) a device creating an arc between the threaded member and the structure;
    c) a device measuring resistance of the structure; and
    d) a device controlling the welding head and the arc as well as determining if a cleaning routine is necessary based on the measurement.

15. The system of claim 14, wherein the threaded member and the structure are parts of a motor vehicle.

16. The system of claim 14, further comprising linearly advancing and retracting the threaded member relative to the structure.

17. The system of claim 16, further comprising an electric motor operably moving the threaded member.

18. The system of claim 14, further comprising welding the threaded member to the structure.

19. The system of claim 14, further comprising a welding source with two capacitor batteries.

20. The system of claim 14, wherein the controller controls an arc current within about 2 ms to about 20 ms.

21. A method for cleaning and welding an element to a component, the method comprising:
   a) lowering the element into electrical contact with the component;
   b) discharging a first electrical arc;
   c) stopping the first electrical arc;
   d) raising the element;
   e) lowering the element into electric contact with the component;
   f) discharging a second electrical arc after stopping the first electrical discharge;
   g) lowering the element to a welding height;
   h) increasing the strength of the second arc; and
   i) welding the element to the component.

22. The method of claim 21, wherein the discharging a first electrical arc is for about 40 ms.

23. The method of claim 21, wherein the stopping is for at least 30 ms.

24. The method of claim 21, wherein the first discharge has a strength of from about 100 mA to about 100 A.

25. The method of claim 21, wherein the second discharge has a strength from about 100 mA to about 100 A.

26. The method of claim 24, wherein the strength is about 100 mA.

27. The method of claim 25, wherein the strength is about 100 mA.

28. The method of claim 21, further comprising controlling an arc current within about 2 ms to about 20 ms.

29. The method of claim 21, wherein the element is a metal stud and the component is a metal sheet.

30. The method of claim 21, wherein the metal stud and the metal sheet are parts of a motor vehicle.

31. The method of claim 21, further comprising measuring a resistance between the element and the component.

32. The method of claim 31, further comprising comparing the resistance to threshold value and determining if the discharging is needed.

* * * * *